United States Patent
Priestley et al.

(10) Patent No.: US 11,921,752 B2
(45) Date of Patent: Mar. 5, 2024

(54) SHARING DATA ACROSS CLOUD-BASED DATA WAREHOUSES

(71) Applicant: SIGMA COMPUTING, INC., San Francisco, CA (US)

(72) Inventors: Jason H. Priestley, Castro Valley, CA (US); Jason D. Frantz, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 261 days.

(21) Appl. No.: 16/913,199

(22) Filed: Jun. 26, 2020

(65) Prior Publication Data
US 2020/0409980 A1 Dec. 31, 2020

Related U.S. Application Data

(60) Provisional application No. 62/868,004, filed on Jun. 28, 2019.

(51) Int. Cl.
*G06F 15/16* (2006.01)
*G06F 16/21* (2019.01)
*G06F 16/245* (2019.01)
*G06F 16/28* (2019.01)
*H04L 67/1097* (2022.01)

(52) U.S. Cl.
CPC .......... *G06F 16/283* (2019.01); *G06F 16/211* (2019.01); *G06F 16/245* (2019.01); *H04L 67/1097* (2013.01)

(58) Field of Classification Search
CPC .... G06F 16/283; G06F 16/245; G06F 16/211; H04L 67/1097
See application file for complete search history.

(56) References Cited

U.S. PATENT DOCUMENTS

| | | | |
|---|---|---|---|
| 2015/0186479 A1* | 7/2015 | Konersmann | H04L 67/1097 707/809 |
| 2016/0147837 A1* | 5/2016 | Nguyen | G06F 16/22 707/771 |
| 2017/0364553 A1 | 12/2017 | Jacob et al. | |
| 2018/0285418 A1 | 10/2018 | Petropoulos et al. | |

OTHER PUBLICATIONS

International Search Report and Written Opinion, PCT/US2020/039912, dated Sep. 23, 2020, 11 pages.

* cited by examiner

*Primary Examiner* — Alex Gofman

(57) ABSTRACT

Sharing data across cloud-based data warehouses establishing a link between a first cloud-based data warehouse and a second cloud-based data warehouse, wherein the link facilitates access to data stored in the second cloud-based data warehouse via the first cloud-based data warehouse; receiving, by the first cloud-based data warehouse, a first query referencing first data stored in the second cloud-based data warehouse; accessing, by the first cloud-based data warehouse, from the second cloud-based data warehouse, the first data; and sending a response to the first query based on the accessed first data.

20 Claims, 7 Drawing Sheets

SHARING DATA ACROSS CLOUD-BASED DATA WAREHOUSES

CROSS-REFERENCE TO RELATED APPLICATIONS

This application is a non-provisional application for patent entitled to a filing date and claiming the benefit of earlier-filed U.S. Provisional Patent Application Ser. No. 62/868,004, filed Jun. 28, 2019.

BACKGROUND

Field of the Invention

The field of the invention is data processing, or, more specifically, methods, apparatus, and products for sharing data across cloud-based data warehouses.

Description of Related Art

Modern businesses may store large amounts of data in remote databases within cloud-based data warehouses. This data may be accessed using database query languages, such as structured query language (SQL). However, some query responses may include too much data to present efficiently in a web application.

SUMMARY

Methods, systems, and apparatus for sharing data across cloud-based data warehouses. Sharing data across cloud-based data warehouses includes establishing a link between a first cloud-based data warehouse and a second cloud-based data warehouse, wherein the link facilitates access to data stored in the second cloud-based data warehouse via the first cloud-based data warehouse; receiving, by the first cloud-based data warehouse, a first query referencing first data stored in the second cloud-based data warehouse; accessing, by the first cloud-based data warehouse, from the second cloud-based data warehouse, the first data; and sending a response to the first query based on the accessed first data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
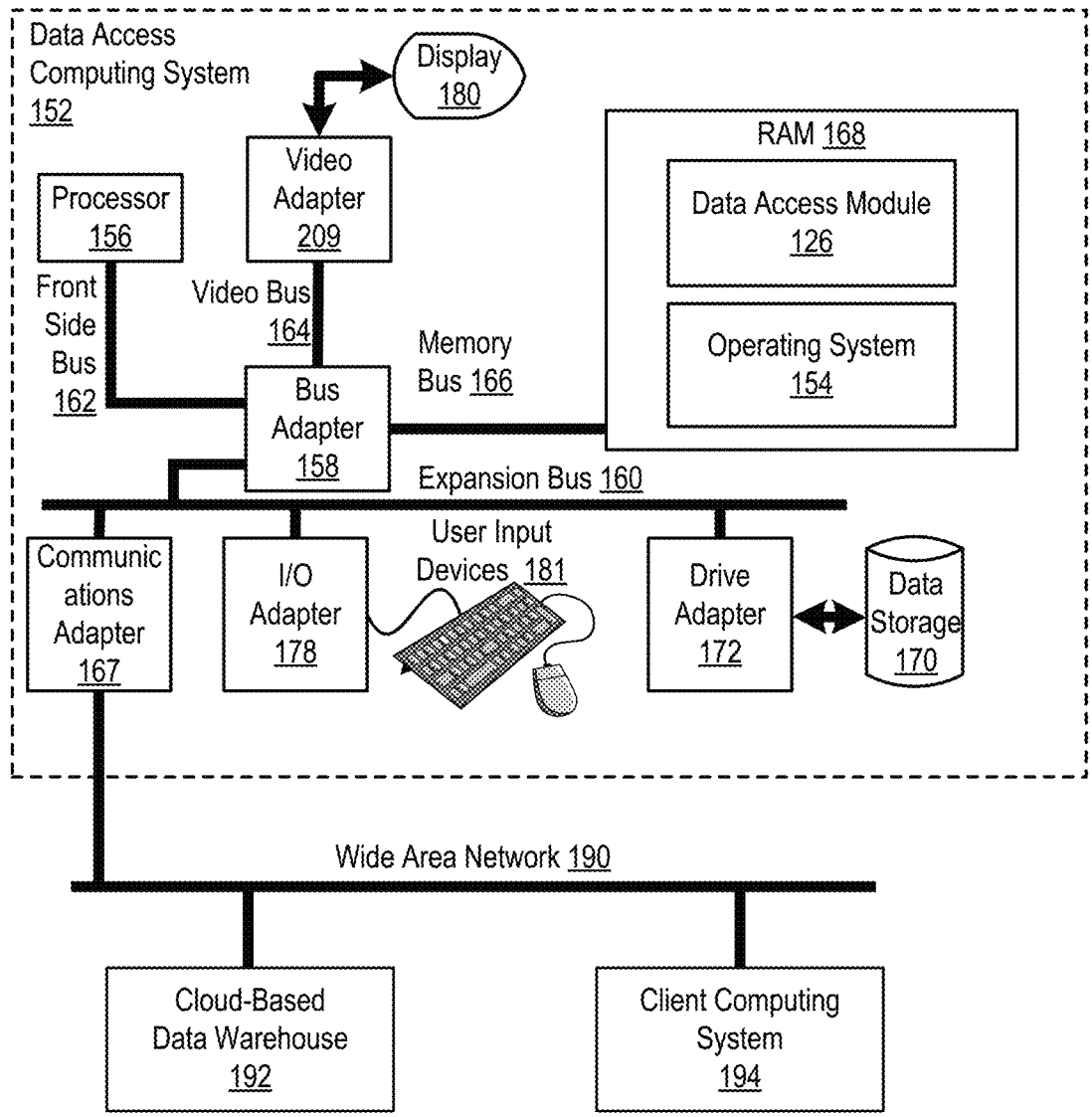
FIG. 1 sets forth a block diagram of an example system configured for sharing data across cloud-based data warehouses according to embodiments of the present invention.

Exemplary methods, apparatus, and products for sharing data across cloud-based data warehouses in accordance with the present invention are described with reference to the accompanying drawings, beginning with FIG. 1. FIG. 1 sets forth a block diagram of automated computing machinery comprising an exemplary data access module computing system (152) configured for sharing data across cloud-based data warehouses according to embodiments of the present invention. The data access module computing system (152) of FIG. 1 includes at least one computer processor (156) or 'CPU' as well as random access memory (168) ('RAM') which is connected through a high speed memory bus (166) and bus adapter (158) to processor (156) and to other components of the data access module computing system (152).

Stored in RAM (168) is an operating system (154). Operating systems useful in computers configured for sharing data across cloud-based data warehouses according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the data access module (126), a module for sharing data across cloud-based data warehouses according to embodiments of the present invention.

The data access module computing system (152) of FIG. 1 includes disk drive adapter (172) coupled through expansion bus (160) and bus adapter (158) to processor (156) and other components of the data access module computing system (152). Disk drive adapter (172) connects non-volatile data storage to the data access module computing system (152) in the form of data storage (170). Disk drive adapters useful in computers configured for sharing data across cloud-based data warehouses according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data access module computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data access module computing system (152) of FIG. 1 includes a video adapter (209), which is an example of an I/O adapter specially designed for graphic output to a display device (180) such as a display screen or computer monitor. Video adapter (209) is connected to processor (156)

through a high speed video bus (164), bus adapter (158), and the front side bus (162), which is also a high speed bus.

The exemplary data access module computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for sharing data across cloud-based data warehouses according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database for access over the wide area network (190). The client computing system (194) is a computing system that accesses the database via the data access module computing system (152).

Figure 2:
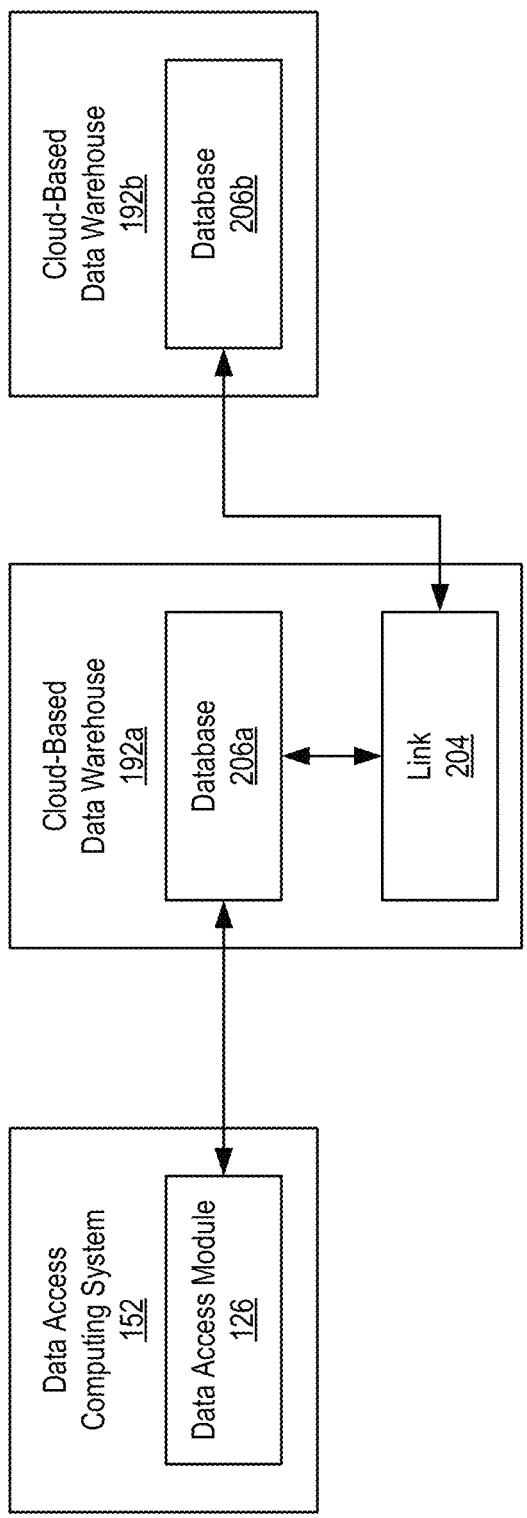
FIG. 2 sets forth a block diagram of an example system configured for sharing data across cloud-based data warehouses according to embodiments of the present invention.

FIG. 2 shows an exemplary block diagram of a system for sharing data across cloud-based data warehouses according to embodiments of the present invention. As shown in FIG. 2, the system includes a data access module computing system (152), a cloud-based data warehouse (192*a*) and a cloud-based data warehouse (192*b*). The data access module computing system (152) includes a data access module (126). The cloud-based data warehouse (192*a*) includes a database (206*a*) and a link (204). The cloud-based data warehouse (192*b*) includes a database (206*b*).

The data access module (126) is hardware, software, or an aggregation of hardware and software configured to generate database queries for submission to the database (206*a*). The databases (206*a*, 206*b*) are collections of data stored in the respective cloud-based data warehouses (192*a*, 192*b*) and management systems for the data. The management systems may receive database queries, such as structure query language (SQL) queries, and respond to queries with a data set.

The link (204) comprises a logical connection between cloud-based data warehouses (192*a*, 192*b*). Accordingly, the link (204) may comprise data facilitating access to data stored in the cloud-based data warehouse (192*b*) via the cloud-based data warehouse (192*a*). Based on the link (204), queries may be submitted to the database (206*a*) referencing data stored in the cloud-based data warehouse (192*a*) and/or the cloud-based data warehouse (192*b*). For example, queries may be submitted to the database (206*a*) to perform JOIN operations, UNION operations, or other transformations based on data stored in both the cloud-based data warehouse (192*a*) and/or the cloud-based data warehouse (192*b*). As another example, queries may be submitted to the database (206*a*) to select or access data stored in the cloud-based data warehouse (192*b*).

In these examples, the data stored in the cloud-based data warehouse (192*b*) may be used to satisfy queries submitted to the cloud-based data warehouse (e.g., via the database (206*a*)) without requiring this data to be stored in the cloud-based data warehouse (192*a*). The link (204) may include access credentials (e.g., usernames, passwords, authentication tokens) facilitating access to the cloud-based data warehouse (192*b*). The link (204) may also comprise Uniform Resource Locators (URLs), Internet Protocol (IP) addresses, or other identifiers facilitating access to the cloud-based data warehouse (192*b*). The link (204) may also include data facilitating a portal, tunnel, private network connection, or other connection to the cloud-based data warehouse (192*b*).

The link (204) may also include one or more portions of a schema of the cloud-based data warehouse (192*a*) (e.g., a portion of a schema of a database (206*b*)) indicating what data stored in the cloud-based data warehouse (192*b*) is accessible via the link (204). For example, the portions of a schema may include table schemas indicating tables that are accessible via the link (204). The portions of the schema may also include view schemas indicating transformations of data accessible via the link (204). Accordingly, these portions of the schema may be encoded into a schema of the database (206*a*) while the link (204) is established, or encoded in metadata accessible to the database (206*a*). Thus, from the perspective of computing systems (e.g., the data access computing system (152)) accessing the cloud-based data warehouse (192*a*), the schema of available data will reflect data stored in both cloud-based data warehouses (192*a*, 192*b*).

The link (204) may also be associated with permissions for the data stored in the cloud-based data warehouse (192*b*). The permissions may be indicated in the link (204) as stored in the cloud-based data warehouse (192*a*). The permissions may be enforced by either cloud-based data warehouse (192*a*, 192*b*). For example, the permissions may indicate a type of permitted access to the data stored in the second cloud-based data warehouse (192*b*) (e.g., read only, read-write)). The permissions may also indicate one or more tables or views to which access is limited. The permissions may further indicate resource usage thresholds (e.g., a maximum number of transactions in a time period, a maximum amount of records or data accessible per transaction, a maximum amount of records or data accessible in a time window, etc.).

As an example, assume that a cloud-based data warehouse (192*b*) stores map data. The map data may be stored as a series of points (e.g., latitude and longitude) in a particular sequence that define the boundary of a particular geographic area. Each point or series of points may be stored as a row in a table. For example, the cloud-based data warehouse (192*b*) may include a table for counties, a table for cities, a table for states, a table for countries, etc. The resulting dataset would be large due to the number of points required to define a single boundary, as well as the large number of boundaries being defined.

Continuing with this example, assume that the cloud-based data warehouse (192*a*) stores census data indicating total populations for various areas. Each area may correspond to its own table (e.g., a "State" table, a "County" table, a "City" table). Further assume that an application (e.g., a website, a user application) is configured to generate a map visualization of counties that are color coded according to their population as recorded in the census data. The application may be configured to use the data access module (126) to query the cloud-based data warehouse (192*a*) for the necessary data. In this example, the map visualization would require census data from the "County" table of the cloud-based data warehouse (192*a*) JOINed with county map data stored in the cloud-based data warehouse (192*b*).

The data access module (126) may submit a first query to the cloud-based data warehouse (192a) for the JOINed data. The cloud-based data warehouse (192a) (e.g., by the database (206a) or another function) may determine, based on the first query, what data needs to be accessed from the cloud-based data warehouse (192b) and generate a second query. For example, the cloud-based data warehouses (192a) may determine tables, views, and query conditions referenced in the first query that are applicable to the cloud-based data warehouse (192b). Continuing with the above example, the cloud-based data warehouse (192a) would determine that the first query requires map data stored in a "County" table of the cloud-based data warehouse (192b).

The cloud-based data warehouse (192a) may then submit the second query to the cloud-based data warehouse (192b) for the required data based on the link (204). For example, the cloud-based data warehouse (192a) may submit the second query to a URL stored in the link (204). The cloud-based data warehouse (192a) may submit the second query using authentication credentials stored in the link (204).

After receiving the map data from the cloud-based data warehouse (192b), the cloud-based data warehouse (192a) may then JOIN the "County" census table with the "County" map data (e.g., on a "County name" column) to generate a data set of population data and corresponding county map data. This response may then be provided back to the data access module (126).

Using this approach, the cloud-based data warehouse (192a) need not locally the large volumes of map data stored in the cloud-based data warehouse (192b). This saves on storage costs associated with the cloud-based data warehouse (192a), and places the burden of updating the map data on entities maintaining the cloud-based data warehouse (192b). As the schema of the database (206a) reflects the data stored in both cloud-based data warehouses (192a, 192b), the data access module (126) need only construct a simple query directed to a single database, as opposed to a more complicated query directed to multiple databases. Furthermore, the map data stored in the cloud-based data warehouse (192b) may be made available to many cloud-based data warehouses using many links.

Figure 3:
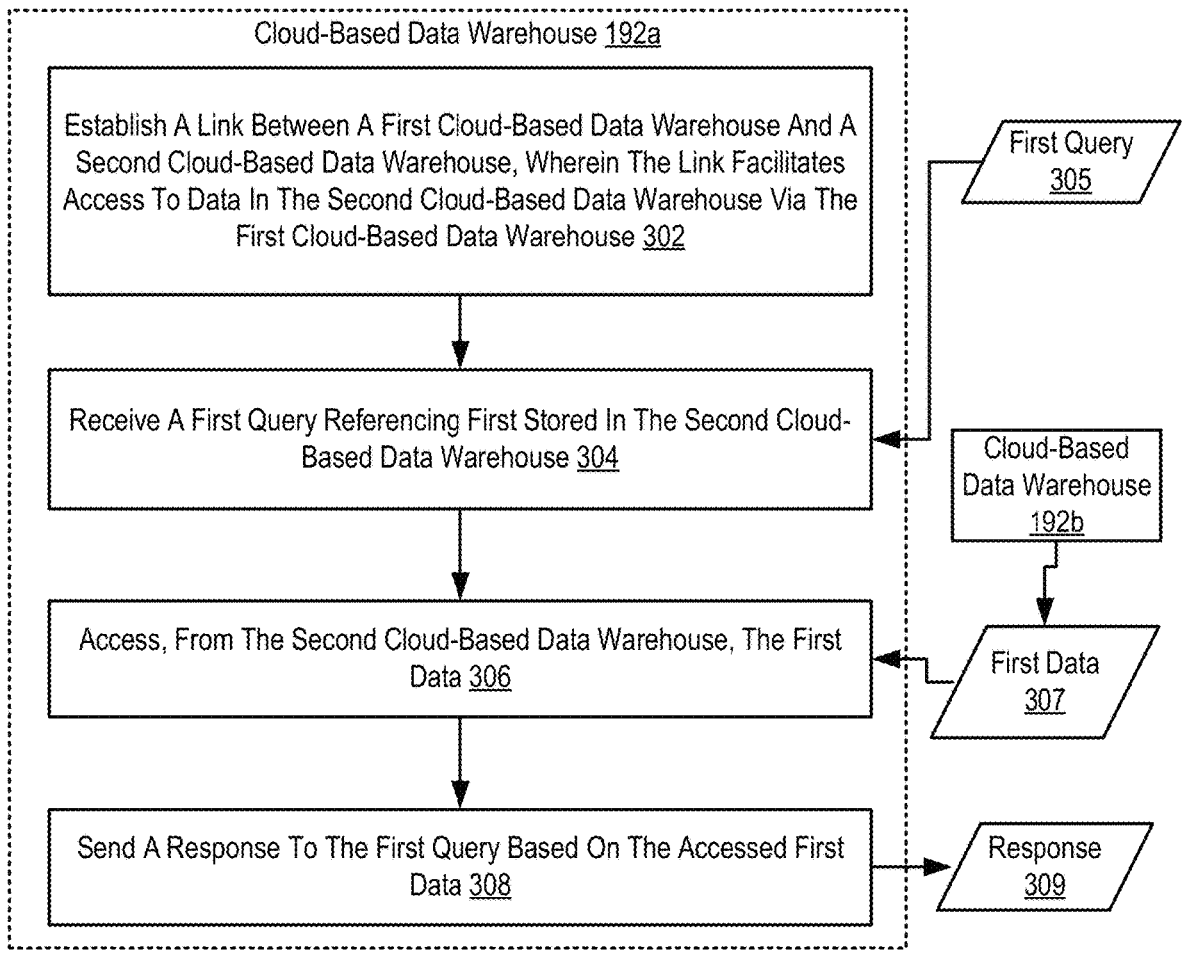
FIG. 3 sets forth a flow chart illustrating an exemplary method for sharing data across cloud-based data warehouses according to embodiments of the present invention.

For further explanation, FIG. 3 sets forth a flow chart illustrating an exemplary method for sharing data across cloud-based data warehouses according to embodiments of the present invention that includes establishing (302) (e.g., by a first cloud-based data warehouse (192a)) a link (204) between a first cloud-based data warehouse (192a) and a second cloud-based data warehouse (192b), wherein the link (204) facilitates access to data in the second cloud-based data warehouse (192b) via the first cloud-based data warehouse (192a).

Establishing the link (204) may include modifying a schema or other metadata of the first cloud-based data warehouse (192a) to reference one or more tables or views of data in the second cloud-based data warehouse (192b). Establishing the link (204a) may also include establishing a network connection (e.g., a tunnel, a portal, a private network connection, etc.) to the second cloud-based data warehouse (192a). Establishing the link (204a) may further include storing authentication credentials (e.g., usernames, passwords, authentication tokens, session identifiers) facilitating access to the second cloud-based data warehouse (192a).

The method of FIG. 3 further comprises receiving (304) a first query (305) (e.g., by the first cloud-based data warehouse (192a) from a data access module (126)) referencing first data stored in the second cloud-based data warehouse (192b)). The first query (305) references one or more tables and/or views of data stored in the second cloud-based data warehouse (192b)). For example, the first query (305) may comprise a query to access, transform, or otherwise interact with data stored in the second cloud-based data warehouse (192b) (e.g., a SELECT query)). The first query (305) may also access, transform, or other interact with data stored in the first cloud-based data warehouse (192a) in combination with data stored in the second cloud-based data warehouse (192b). For example, the first query (305) may comprise a query to JOIN rows from a table in the first cloud-based data warehouse (192a) with rows from another table in the second cloud-based data warehouse (192b).

The method of FIG. 3 further comprises accessing (306) (e.g., by the first cloud-based data warehouse (192a)), from the second cloud-based data warehouse (192b), the first data (307). Accessing (306) the first data (307) may comprise determining one or more tables, views, and/or rows referenced in the first query (305) and accessing the referenced data (307). For example, a schema in the first cloud-based data warehouse (192a) (e.g., of a database (206a)) may reference data (e.g., tables) stored in both the first cloud-based data warehouse (192a) and the second cloud-based data warehouse (192b). Metadata may indicate which tables of the schema correspond to data stored in the second cloud-based data warehouse (192b).

Accessing (306) the first data (307) may be facilitated by the link (204). For example, accessing (306) the first data (307) may comprise providing authentication credentials (e.g., usernames, passwords, authentication tokens, session identifiers, etc.) to the second cloud-based data warehouse (192b). As another example, first data (307) may be accessed via a network connection, tunnel, portal, or URL referenced in the link (204).

The method of FIG. 3 further comprises sending (308) (e.g., by the first cloud-based data warehouse (192a) to the data access module (126)) a response (309) to the first query (305) based on the accessed first data (307). Sending (308) the response may comprise transforming or otherwise modifying the accessed first data (307). For example, the accessed first data (307) may be combined with, appended to, or otherwise transformed in combination with data stored in the first cloud-based data warehouse (192a) to generate the response (309).

Figure 4:
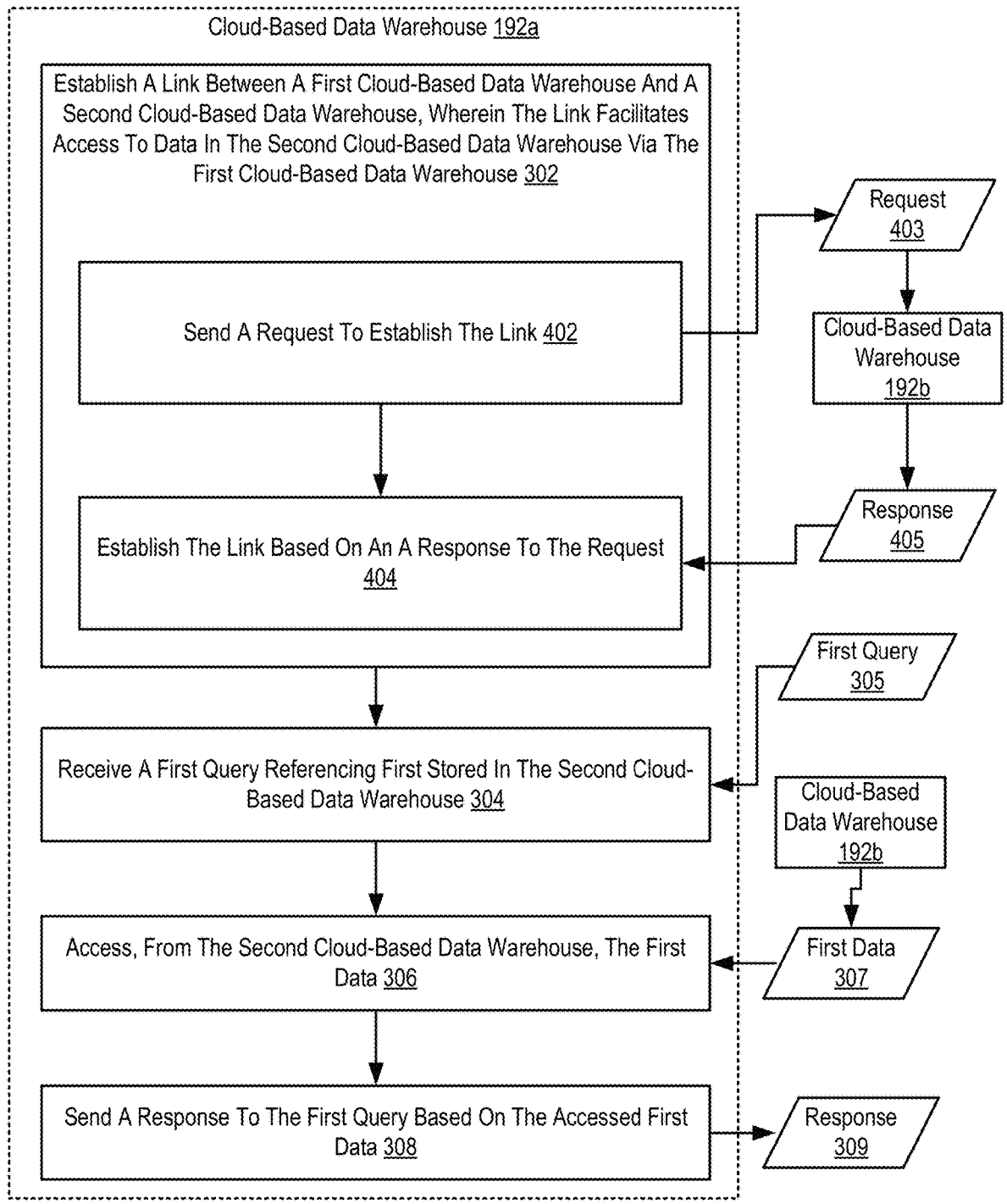
FIG. 4 sets forth a flow chart illustrating an exemplary method for sharing data across cloud-based data warehouses according to embodiments of the present invention.

For further explanation, FIG. 4 sets forth a flow chart illustrating an exemplary method for sharing data across cloud-based data warehouses according to embodiments of the present invention that includes establishing (302) (e.g., by a first cloud-based data warehouse (192a)) a link (204) between a first cloud-based data warehouse (192a) and a second cloud-based data warehouse (192b), wherein the link (204) facilitates access to data in the second cloud-based data warehouse (192b) via the first cloud-based data warehouse (192a); receiving (304) a first query (305) (e.g., by the first cloud-based data warehouse (192a) from a data access module (126)) referencing first data (307) stored in the second cloud-based data warehouse (192b)); accessing (306) (e.g., by the first cloud-based data warehouse (192a)), from the second cloud-based data warehouse (192b), the first data (307); and sending (308) (e.g., by the first cloud-based data warehouse (192a) to the data access module (126)) a response (309) to the first query (305) based on the accessed first data (307).

The method of FIG. 4 differs from FIG. 3 in that establishing (302) the link (204) between the first cloud-based data warehouse (192a) and the second cloud-based data warehouse (192b) comprises sending (402) (e.g., by the first cloud-based data warehouse (192a) to the second cloud-based data warehouse (192b)) a request (403) to establish the link (204). The request (403) may indicate one or more tables, one or more views, and/or one or more rows stored in the second cloud-based data warehouse (192b) to which access is requested. The request (403) may also comprise authentication credentials (e.g., a username, account identifier, and/or password). For example, the second cloud-based data warehouse (192b) may maintain user accounts associated with tables, views, and/or rows of data. Accordingly, the request (403) may indicate the account corresponding to the tables, views, and/or rows to which access is requested.

The request (403) may further comprise resource usage requests. The resource usage requests may comprise an amount of resources requested to be used by the first cloud-based data warehouse (192a) via the link. For example, the resource usage requests may comprise a requested total amount of transactions, records, or data accessed for the duration of the link, a requested threshold amount of transactions, records, or data accessed within a time window, or another metric.

The method of FIG. 4 differs from FIG. 3 in that establishing (302) the link (204) between the first cloud-based data warehouse (192a) and the second cloud-based data warehouse (192b) comprises establishing (404) the link (204) based on a response (405) to the request (403). For example, establishing (404) the link (204) based on the response (405) may comprise storing an authentication token facilitating access to the second cloud-based data warehouse (192b). The response (405) may indicate one or more tables, views, and or rows of data stored in the second cloud-based data warehouse (192b) that may be accessed. Accordingly, establishing (404) the link (204) based on the response (405) may comprise modifying a schema of the first cloud-based data warehouse (192a) (e.g., of a database (206a)) to include the tables, views, and/or rows of data indicated in the response (405). Establishing (404) the link (204) based on the response (405) may also comprise updating metadata to indicate which portions of the updated schema correspond to data stored in the second cloud-based data warehouse (192b).

The response (405) may also include one or more resource usage thresholds for accessing data in the second cloud-based data warehouse (192b). The one or more resource usage thresholds for accessing data in the second cloud-based data warehouse (192b) may be the same as or different from one or more resource usage thresholds included in the request (403). Accordingly, establishing (404) the link (204) based on the response (405) may also comprise storing indications of the one or more resource usage thresholds.

The response (405) may also include IP addresses, URLs, or network addresses facilitating access to data stored in the second cloud-based data warehouse (192b). Accordingly, establishing (404) the link (204) based on the response (405) may also comprise storing indications of the IP addresses, URLs, or network addresses in the link (204) for submission of future queries to the second cloud-based data warehouse (192b).

Figure 5:
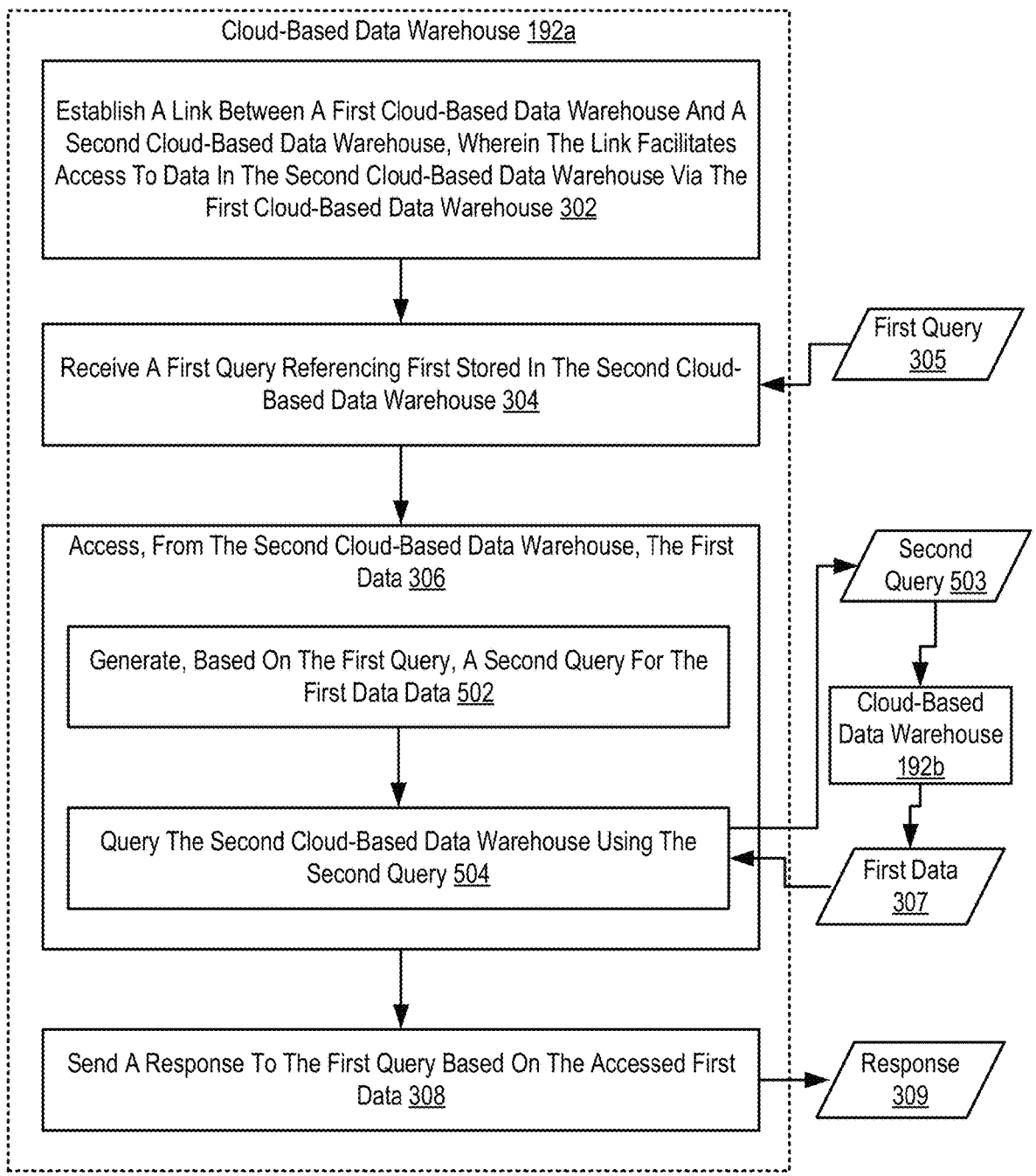
FIG. 5 sets forth a flow chart illustrating an exemplary method for sharing data across cloud-based data warehouses according to embodiments of the present invention.

For further explanation, FIG. 5 sets forth a flow chart illustrating an exemplary method for sharing data across cloud-based data warehouses according to embodiments of the present invention that includes establishing (302) (e.g., by a first cloud-based data warehouse (192a)) a link (204) between a first cloud-based data warehouse (192a) and a second cloud-based data warehouse (192b), wherein the link (204) facilitates access to data in the second cloud-based data warehouse (192b) via the first cloud-based data warehouse (192a); receiving (304) a first query (305) (e.g., by the first cloud-based data warehouse (192a) from a data access module (126)) referencing first data (307) stored in the second cloud-based data warehouse (192b)); accessing (306) (e.g., by the first cloud-based data warehouse (192a)), from the second cloud-based data warehouse (192b), the first data (307); and sending (308) (e.g., by the first cloud-based data warehouse (192a) to the data access module (126)) a response (309) to the first query (305) based on the accessed first data (307).

The method of FIG. 5 differs from FIG. 3 in that accessing (306), from the second cloud-based data warehouse (192b), the first data (307) comprises generating (502), based on the first query (305), a second query (503) for the first data (307). Generating (502) the second query (503) may comprise identifying one or more tables, views, or rows of data stored in the second cloud-based data warehouse (192b) that are referenced in the first query (305). For example, metadata may be stored in the first cloud-based data warehouse (192a) indicating which portions of a schema of the first cloud-based data warehouse (192a) correspond to data stored in the second cloud-based data warehouse (192b). The one or more tables, views, or rows of data stored in the second cloud-based data warehouse (192b) that are referenced in the first query (305) may be identified based on this metadata. Generating (502) the second query (503) may also comprise including one or more constraints from the first query (305) (e.g., WHEREIN clauses) in the second query (503). The included constraints from the first query (305) are applicable to data stored in the second cloud-based data warehouse (192b) and referenced in the first query (305).

The method of FIG. 5 differs from FIG. 3 in that accessing (306), from the second cloud-based data warehouse (192b), the first data (307) comprises querying (504) the second cloud-based data warehouse (192b) using the second query (503). For example, the second query (504) may be issued to the second cloud-based data warehouse (192b) (e.g., to a database (206b)) via the link (204) (e.g., using authentication credentials, network addresses, or other data included in the link (204)). The first data (307) may then be received from the second cloud-based data warehouse (192b) in response to the second query (503).

Figure 6:
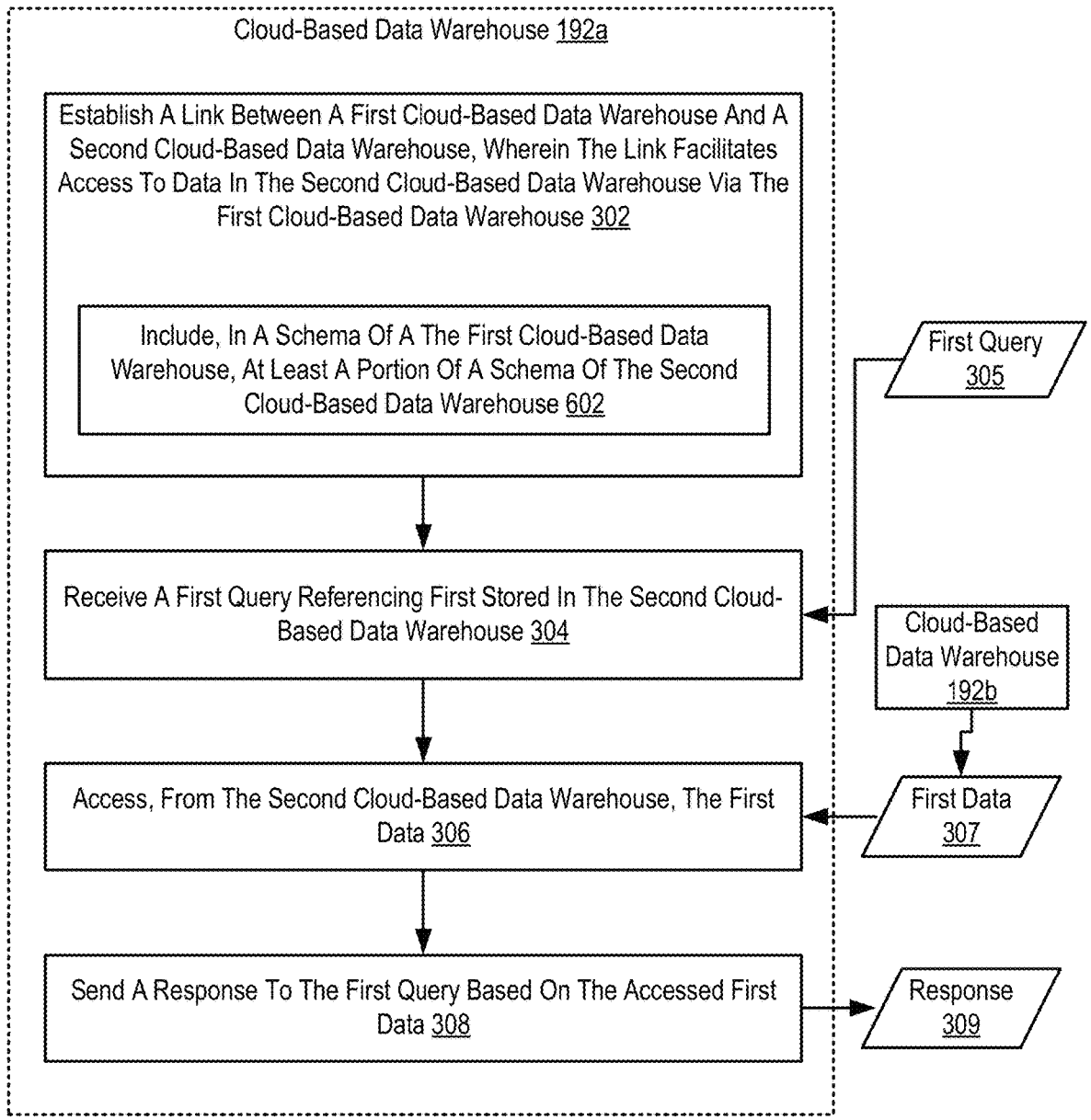
FIG. 6 sets forth a flow chart illustrating an exemplary method for sharing data across cloud-based data warehouses according to embodiments of the present invention.

For further explanation, FIG. 6 sets forth a flow chart illustrating an exemplary method for sharing data across cloud-based data warehouses according to embodiments of the present invention that includes establishing (302) (e.g., by a first cloud-based data warehouse (192a)) a link (204) between a first cloud-based data warehouse (192a) and a second cloud-based data warehouse (192b), wherein the link (204) facilitates access to data in the second cloud-based data warehouse (192b) via the first cloud-based data warehouse (192a); receiving (304) a first query (305) (e.g., by the first cloud-based data warehouse (192a) from a data access module (126)) referencing first data (307) stored in the second cloud-based data warehouse (192b)); accessing (306) (e.g., by the first cloud-based data warehouse (192a)), from the second cloud-based data warehouse (192b), the first data (307); and sending (308) (e.g., by the first cloud-based data warehouse (192a) to the data access module (126)) a response (309) to the first query (305) based on the accessed first data (307).

The method of FIG. 6 differs from FIG. 3 in that establishing (302) the link (204) between the first cloud-based data warehouse (192a) and the second cloud-based data warehouse (192b) comprises including (602), in a schema of the first cloud-based data warehouse (192a), at least a portion of a schema of the second cloud-based data warehouse (192b). For example, one or more tables or views of data stored in the second cloud-based data warehouse (192b) may be accessible to the first cloud-based data warehouse (192a). These one or more tables or views may be added to a schema of the first cloud-based data warehouse (192a) (e.g., of a database (206a)). The resulting schema references both data stored in the first cloud-based data warehouse (192a) and the second cloud-based data warehouse (192b). Thus, only the schema of data stored in the second cloud-based data warehouse (192b) is stored in the first cloud-based data warehouse (192a), not a local copy of the data itself.

Including (602), in a schema of the first cloud-based data warehouse (192a), at least a portion of a schema of the second cloud-based data warehouse (192b), may also comprise updating metadata (e.g., of the link (204), of the database (206a), or other data) to indicate the portion of the schema that corresponds to data stored in the second cloud-based data warehouse (192b). The facilitates later determinations as to whether incoming queries (e.g., a first query (305)) reference data stored in the first cloud-based data warehouse (192a) or the second cloud-based data warehouse (192b).

Figure 7:
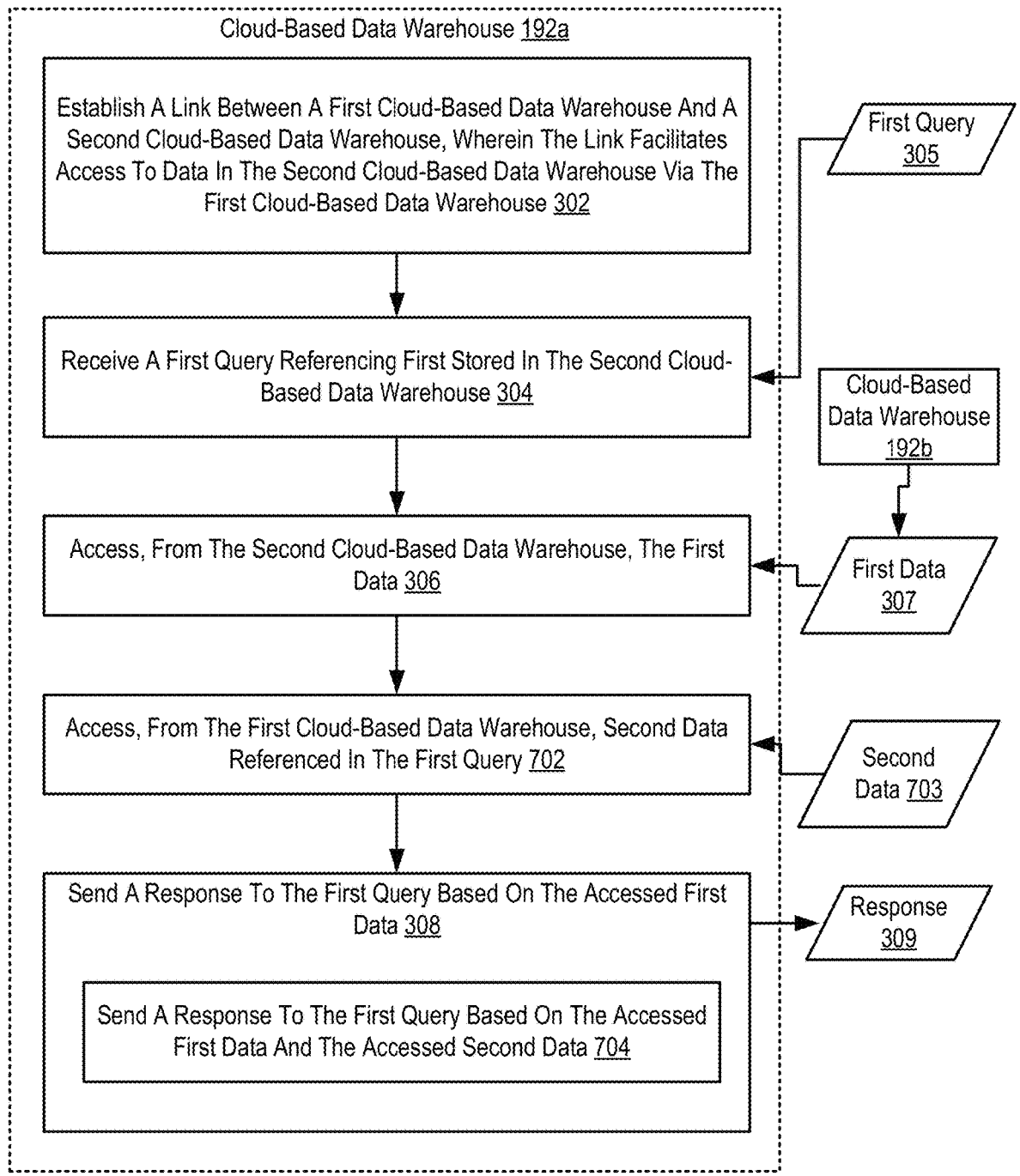
FIG. 7 sets forth a flow chart illustrating an exemplary method for sharing data across cloud-based data warehouses according to embodiments of the present invention.

For further explanation, FIG. 7 sets forth a flow chart illustrating an exemplary method for sharing data across cloud-based data warehouses according to embodiments of the present invention that includes establishing (302) (e.g., by a first cloud-based data warehouse (192a)) a link (204) between a first cloud-based data warehouse (192a) and a second cloud-based data warehouse (192b), wherein the link (204) facilitates access to data in the second cloud-based data warehouse (192b) via the first cloud-based data warehouse (192a); receiving (304) a first query (305) (e.g., by the first cloud-based data warehouse (192a) from a data access module (126)) referencing first data (307) stored in the second cloud-based data warehouse (192b)); accessing (306) (e.g., by the first cloud-based data warehouse (192a)), from the second cloud-based data warehouse (192b), the first data (307); and sending (308) (e.g., by the first cloud-based data warehouse (192a) to the data access module (126)) a response (309) to the first query (305) based on the accessed first data (307).

The method of FIG. 7 differs from FIG. 3 in that the method of FIG. 7 further includes accessing (702), from the first cloud-based data warehouse (192a), second data (703) referenced in the first query (305). For example, assume that the first cloud-based data warehouse (192a) stores per-county census data in a first table, and that the second cloud-based data warehouse stores per-county map data in a second table. Further assume that the first query (305) comprises a query to JOIN the first table (stored in the first cloud-based data warehouse (192a)) with the second table (stored in the second cloud-based data warehouse (192a)). Using this example, accessing (702), from the first cloud-based data warehouse (192a), second data (703) referenced in the first query (305) would comprise accessing, as the second data (703), the per-county census data stored in the first cloud-based data warehouse (192a). Continuing with this example, the first data (307) would comprise the per-county map data stored in the second cloud-based data warehouse (192b).

The method of FIG. 7 differs from FIG. 3 in that sending (308) a response (309) to the first query (305) based on the accessed first data (307) comprises sending (704) a response (309) to the first query (305) based on the accessed first data (307) and the accessed second data (703). For example, sending (308) the response may comprise performing a transformation, combination, or other operation on the first data (307) and second data (703) to generate the response (309). Continuing with the example above, sending (704) the response (309) would comprise performing a JOIN operation on the map data stored in the first data (307) and the census data stored in the second data (703). Thus, the resulting response (309) is based on data stored in different cloud-based data warehouses (192a, 192b) and generated in response to a query to the single first cloud-based data warehouse (192a).

In view of the explanations set forth above, readers will recognize that the benefits of sharing data across cloud-based data warehouses according to embodiments of the present invention include:

Improving the operation of a computing system by maintaining a single, general data source in a single cloud-based data warehouse that is accessible by any number of other cloud-based data warehouses, improving overall storage efficiency.

Improving the operation of a computing system by maintaining a single, general data source that can be updated in a single cloud-based data warehouse, allowing other cloud-based data warehouses accessing the general data source to receive the most up-to-date data.

Improving the operation of a computing system by allowing for data stored on multiple cloud-based data warehouses to be accessed using queries directed to a single cloud-based data warehouse.

Exemplary embodiments of the present invention are described largely in the context of a fully functional computer system for sharing data across cloud-based data warehouses. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of sharing data across cloud-based data warehouses, the method comprising:
   establishing a link between a first cloud-based data warehouse and a second cloud-based data warehouse, wherein the link facilitates access to data stored in the second cloud-based data warehouse via the first cloud-based data warehouse;
   receiving, by the first cloud-based data warehouse, a first query referencing first data stored in the second cloud-based data warehouse;

accessing, by the first cloud-based data warehouse, from the second cloud-based data warehouse, the first data; and sending a response to the first query based on the accessed first data.

2. The method of claim 1, wherein establishing the link further comprises:
sending, to the second cloud-based data warehouse, a request to establish the link; and
establishing, based on a response to the request, the link.

3. The method of claim 1, wherein accessing the first data comprises:
generating, based on the first query, a second query for the first data; and
querying the second cloud-based data warehouse using the second query.

4. The method of claim 1, wherein the data stored in the second cloud-based data warehouse is accessible to a plurality of cloud-based data warehouses via a plurality of links.

5. The method of claim 1, wherein establishing the link comprises including, in a schema of the first cloud-based data warehouse, at least a portion of a schema of the second cloud-based data warehouse.

6. The method of claim 5, wherein the at least a portion of the schema of the second cloud-based data warehouse comprises one or more of a table schema or a view schema.

7. The method of claim 1, further comprising:
accessing second data from the first cloud-based data warehouse; and
wherein sending the response to the first query based on the accessed first data comprises sending the response to the first query based on the accessed first data and the accessed second data.

8. An apparatus for sharing data across cloud-based data warehouses, the apparatus comprising a computer processor, a computer memory operatively coupled to the computer processor, the computer memory having disposed within it computer program instructions that, when executed by the computer processor, cause the apparatus to carry out the steps of:
establishing a link between a first cloud-based data warehouse and a second cloud-based data warehouse, wherein the link facilitates access to data stored in the second cloud-based data warehouse via the first cloud-based data warehouse;
receiving, by the first cloud-based data warehouse, a first query referencing first data stored in the second cloud-based data warehouse;
accessing, by the first cloud-based data warehouse, from the second cloud-based data warehouse, the first data; and
sending a response to the first query based on the accessed first data.

9. The apparatus of claim 8, wherein establishing the link further comprises:
sending, to the second cloud-based data warehouse, a request to establish the link; and
establishing, based on a response to the request, the link.

10. The apparatus of claim 8, wherein accessing the first data comprises:
generating, based on the first query, a second query for the first data; and
querying the second cloud-based data warehouse using the second query.

11. The apparatus of claim 8, wherein the data stored in the second cloud-based data warehouse is accessible to a plurality of cloud-based data warehouses via a plurality of links.

12. The apparatus of claim 8, wherein establishing the link comprises including, in a schema of the first cloud-based data warehouse, at least a portion of a schema of the second cloud-based data warehouse.

13. The apparatus of claim 12, wherein the at least a portion of the schema of the second cloud-based data warehouse comprises one or more of a table schema or a view schema.

14. The apparatus of claim 8, wherein the steps further comprise:
accessing second data from the first cloud-based data warehouse; and
wherein sending the response to the first query based on the accessed first data comprises sending the response to the first query based on the accessed first data and the accessed second data.

15. A computer program product for sharing data across cloud-based data warehouses, the computer program product comprising a non-transitory computer readable storage medium having computer program instructions stored therein that, when executed, cause a computer to carry out the steps of:
establishing a link between a first cloud-based data warehouse and a second cloud-based data warehouse, wherein the link facilitates access to data stored in the second cloud-based data warehouse via the first cloud-based data warehouse;
receiving, by the first cloud-based data warehouse, a first query referencing first data stored in the second cloud-based data warehouse;
accessing, by the first cloud-based data warehouse, from the second cloud-based data warehouse, the first data; and
sending a response to the first query based on the accessed first data.

16. The computer program product of claim 15, wherein establishing the link further comprises:
sending, to the second cloud-based data warehouse, a request to establish the link; and
establishing, based on a response to the request, the link.

17. The computer program product of claim 15, wherein accessing the first data comprises:
generating, based on the first query, a second query for the first data; and
querying the second cloud-based data warehouse using the second query.

18. The computer program product of claim 15, wherein the data stored in the second cloud-based data warehouse is accessible to a plurality of cloud-based data warehouses via a plurality of links.

19. The computer program product of claim 15, wherein establishing the link comprises including, in a schema of the first cloud-based data warehouse, at least a portion of a schema of the second cloud-based data warehouse.

20. The computer program product of claim 19, wherein the at least a portion of the schema of the second cloud-based data warehouse comprises one or more of a table schema or a view schema.

* * * * *